(12) United States Patent
White

(10) Patent No.: US 7,842,323 B1
(45) Date of Patent: Nov. 30, 2010

(54) MAT DEVICE AND METHOD OF USE

(76) Inventor: Elizabeth White, 2221 E. Union Hills Dr., Phoenix, AZ (US) 85024

( * ) Notice: Subject to any disclaimer, the term of this patent is extended or adjusted under 35 U.S.C. 154(b) by 932 days.

(21) Appl. No.: 11/685,020

(22) Filed: Mar. 12, 2007

(51) Int. Cl.
*A21D 8/08* (2006.01)
(52) U.S. Cl. .................................. 426/502; 426/517
(58) Field of Classification Search ............... 426/112, 426/122, 128, 125, 502, 512, 505, 517
See application file for complete search history.

(56) References Cited

U.S. PATENT DOCUMENTS

| | | | |
|---|---|---|---|
| 229,045 A | 6/1880 | Johnson | |
| 2,555,033 A * | 5/1951 | Harris | 426/87 |
| 2,616,376 A * | 11/1952 | Hammerstein | 425/317 |
| 2,744,475 A * | 5/1956 | Ayres | 425/470 |
| 3,194,185 A * | 7/1965 | Spinosa | 426/556 |
| 3,819,316 A * | 6/1974 | Davis, Jr. | 425/470 |
| 3,958,797 A * | 5/1976 | Brow | 269/302.1 |
| 4,049,836 A | 9/1977 | Davis, Jr. | |
| 4,053,641 A * | 10/1977 | Elling | 426/19 |
| 4,077,307 A * | 3/1978 | Davis, Jr. | 493/187 |
| 4,081,169 A * | 3/1978 | Lauter | 249/115 |
| 4,520,035 A * | 5/1985 | Lamonica | 426/128 |
| 5,023,134 A | 6/1991 | Bezigian et al. | |
| 5,431,943 A | 7/1995 | Sellmann | |
| 5,520,945 A * | 5/1996 | Coggins | 426/496 |
| 6,000,237 A * | 12/1999 | Sjoberg | 62/457.2 |
| 6,194,062 B1 * | 2/2001 | Hamilton et al. | 428/343 |
| 7,451,889 B2 * | 11/2008 | Mantis | 220/530 |
| 2003/0201271 A1 * | 10/2003 | Smith et al. | 220/574 |
| 2006/0102273 A1 * | 5/2006 | White, II | 156/152 |
| 2008/0160148 A1 * | 7/2008 | Dodelson et al. | 426/496 |

FOREIGN PATENT DOCUMENTS

DE 4322502 A1 * 1/1995

OTHER PUBLICATIONS

Wilton "Roll & Cut Mat" box information, copyright 2007.*

* cited by examiner

*Primary Examiner*—Drew E Becker

(57) ABSTRACT

A mat device for receiving dough to be rolled out and reducing the mess usually associated with rolling out of the dough includes a sheet including a top surface and a bottom surface. The bottom surface is positioned on a support surface. The sheet has a folding line extending along a width of the sheet and bisecting the sheet into a first section and a second section. The folding line facilitates folding of the second section with respect to the first section. An adhesive is coupled to the bottom surface of the first section of the sheet. The adhesive releasably adheres the first section to the support surface when the first section is placed on the support surface.

3 Claims, 4 Drawing Sheets

MAT DEVICE AND METHOD OF USE

BACKGROUND OF THE INVENTION

1. Field of the Invention

The present invention relates to dough forming devices and more particularly pertains to a new dough forming device for receiving dough to be rolled out and reducing the untidiness usually associated with rolling out of the dough.

2. Description of the Prior Art

The use of dough forming devices is known in the prior art. While these devices fulfill their respective, particular objectives and requirements, the need remains for a device that has certain improved features that allow for a section of the device to be adhered to a support surface to prevent the device from sliding around when dough is being rolled out on the device. Additionally, the device should include a folding line to facilitate folding of one section of the device over the other section of the device. The device should also prevent the sticking to the rolling pin of the dough.

SUMMARY OF THE INVENTION

The present invention meets the needs presented above by generally comprising a sheet including a top surface and a bottom surface. The bottom surface is positioned on a support surface. The sheet has a folding line extending along a width of the sheet and bisecting the sheet into a first section and a second section. The folding line facilitates folding of the second section with respect to the first section. An adhesive is coupled to the bottom surface of the first section of the sheet. The adhesive releasably adheres the first section to the support surface when the first section is placed on the support surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
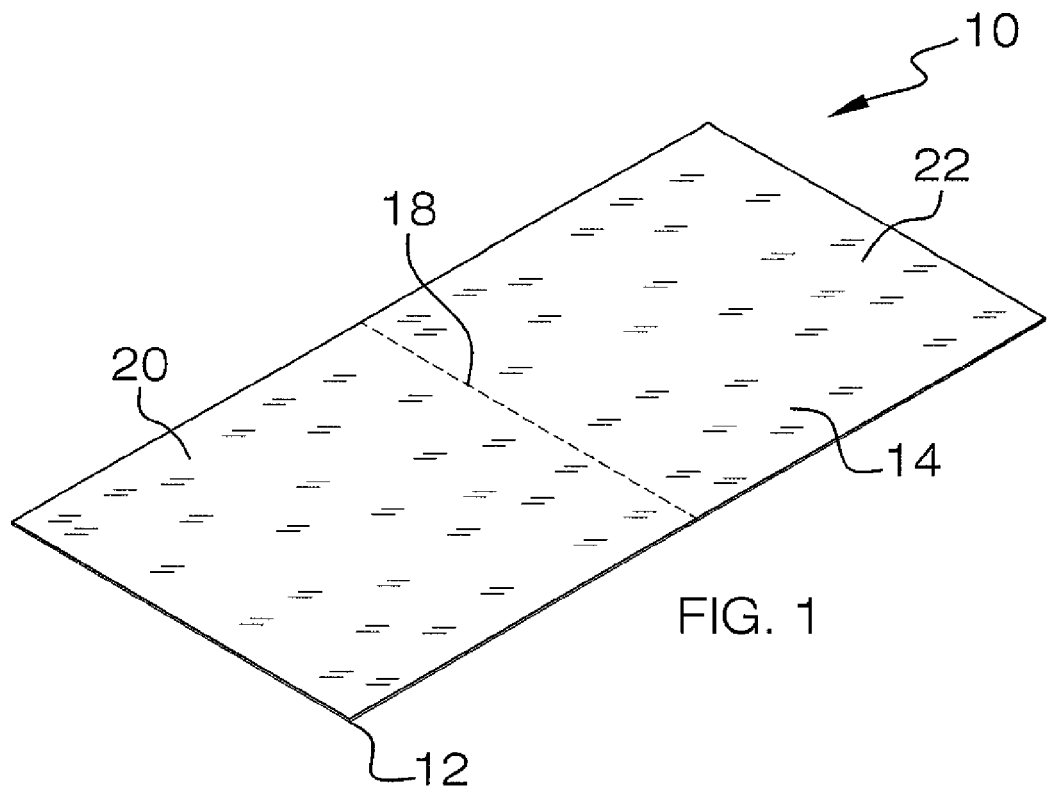
FIG. 1 is a top perspective view of a mat device according to the present invention.
Figure 2:
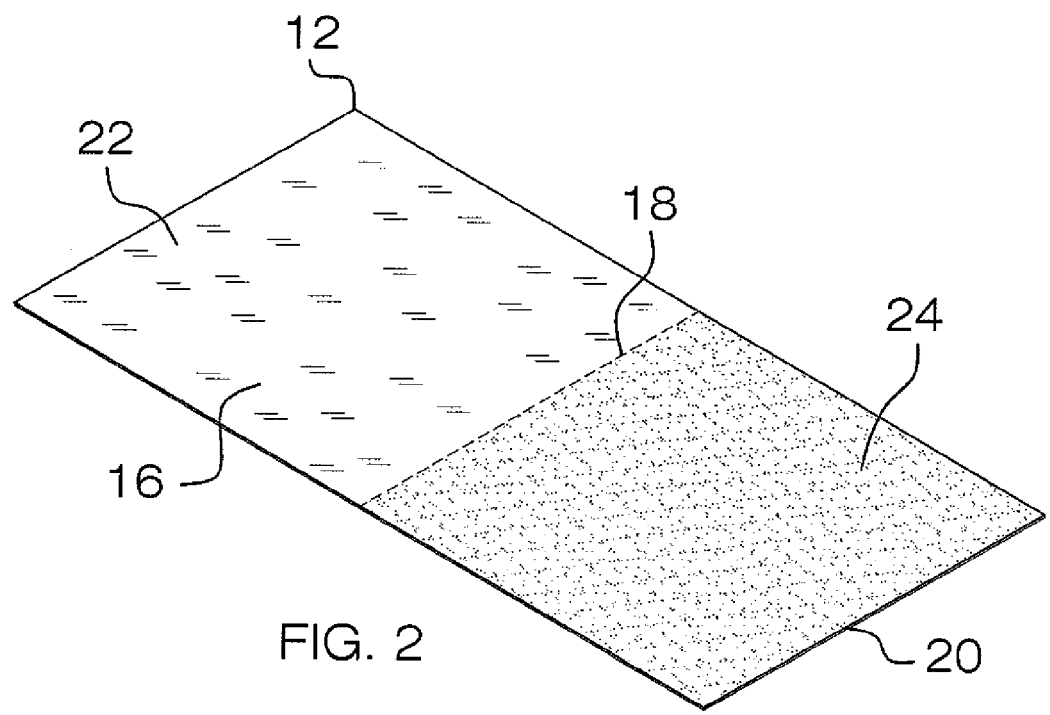
FIG. 2 is a bottom perspective view of the present invention.
Figure 3:
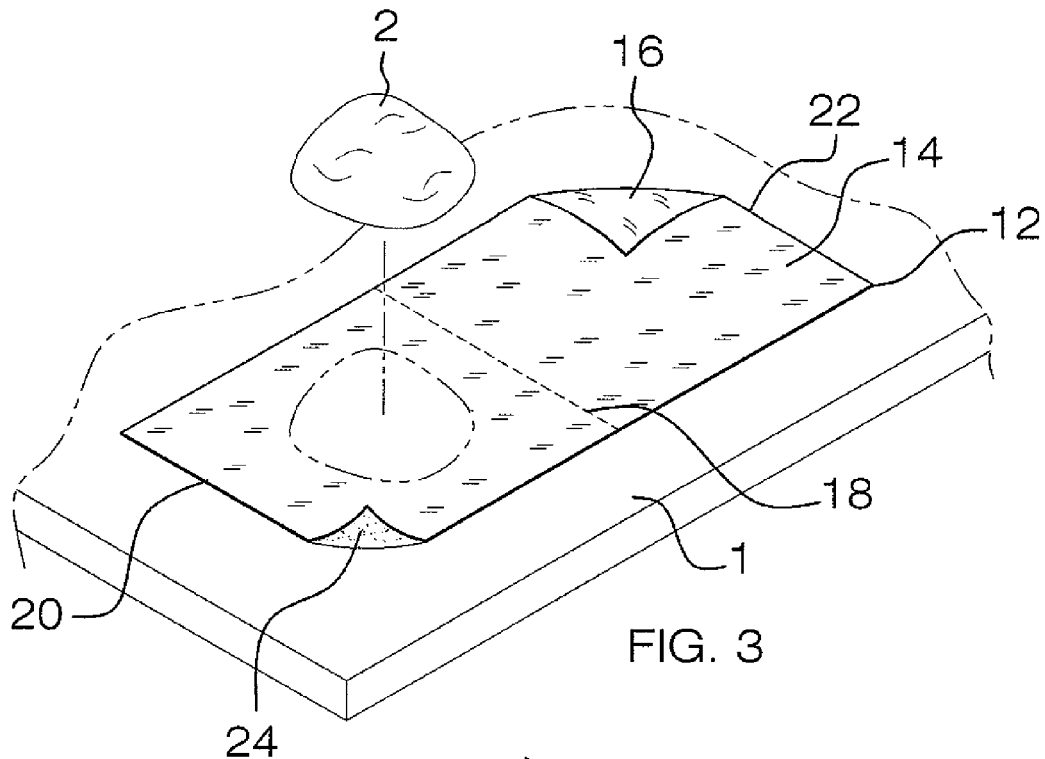
FIG. 3 is a perspective view of the present invention showing the dough being placed on the top surface.
Figure 4:
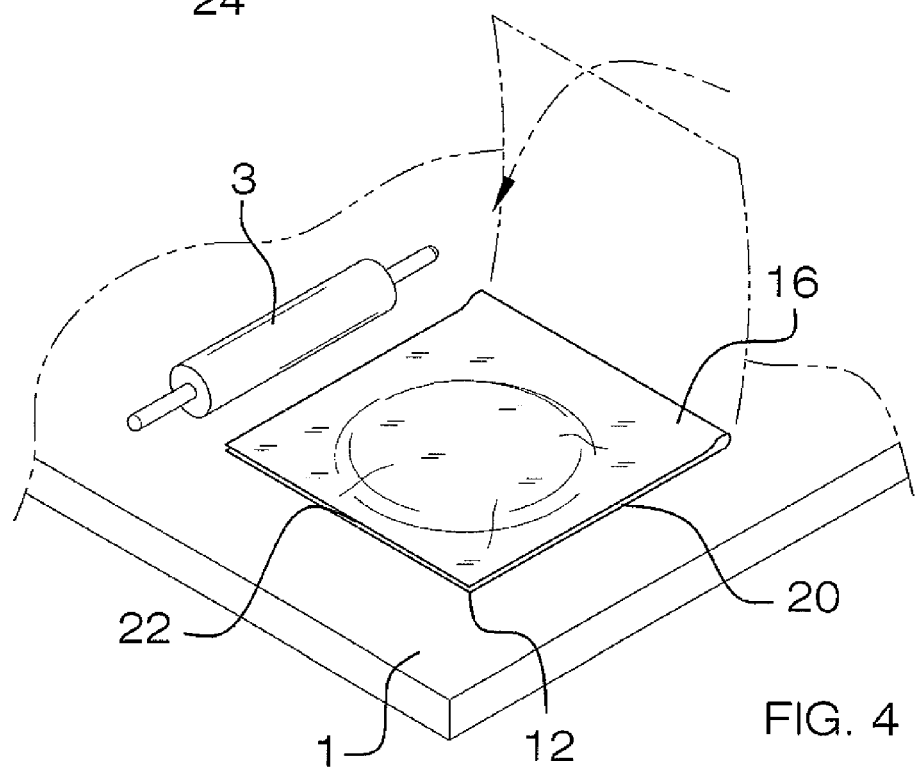
FIG. 4 is a perspective view of the present invention showing the second section folded over the first section and the dough rolled out.
Figure 5:
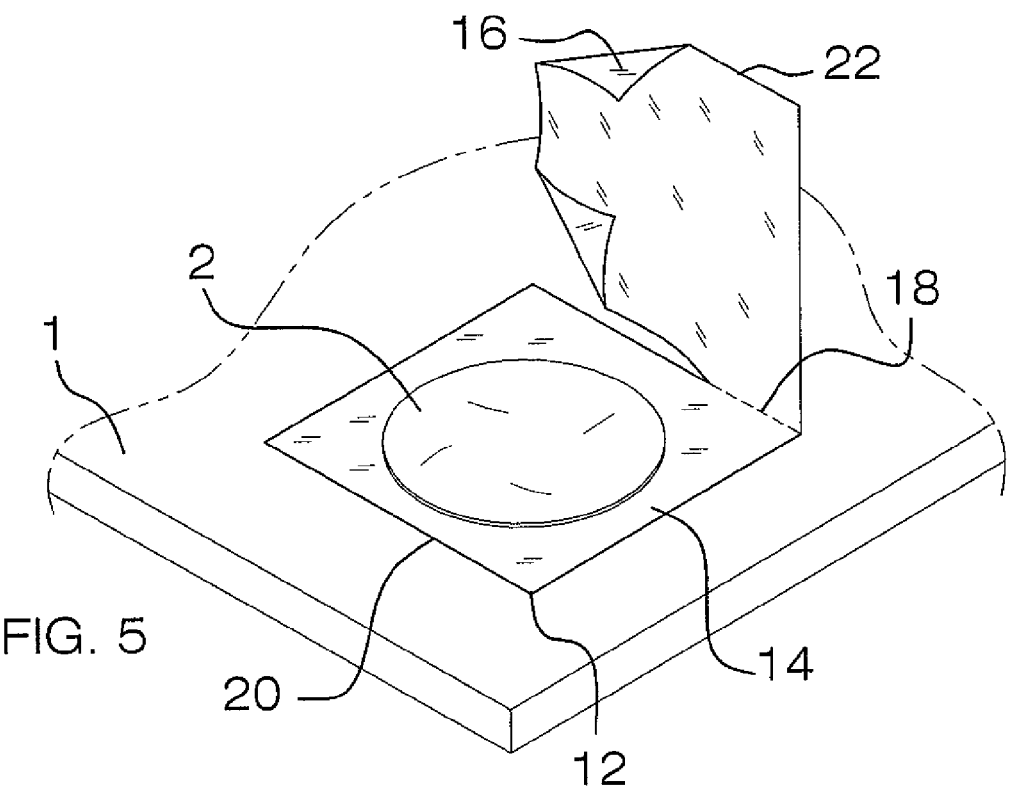
FIG. 5 is a perspective view of the present invention showing the second section being removed from the first section.
Figure 6:
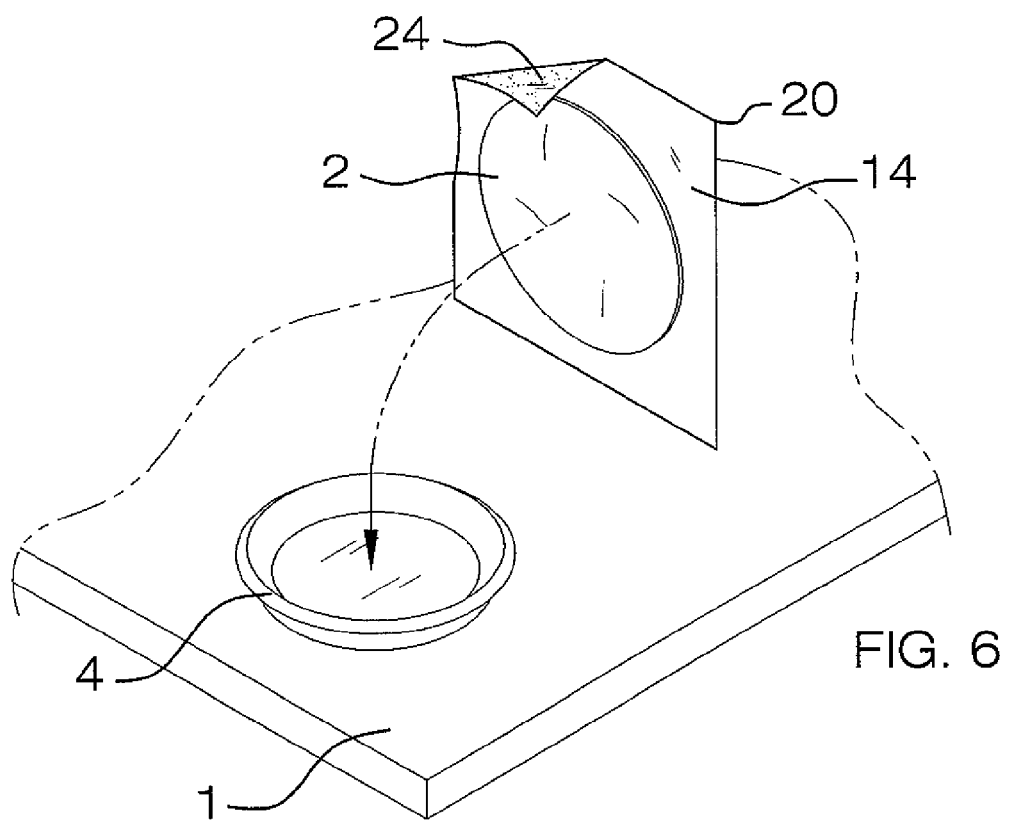
FIG. 6 is a perspective view of the present invention showing the first section removed from the support surface with the dough attached.
Figure 7:
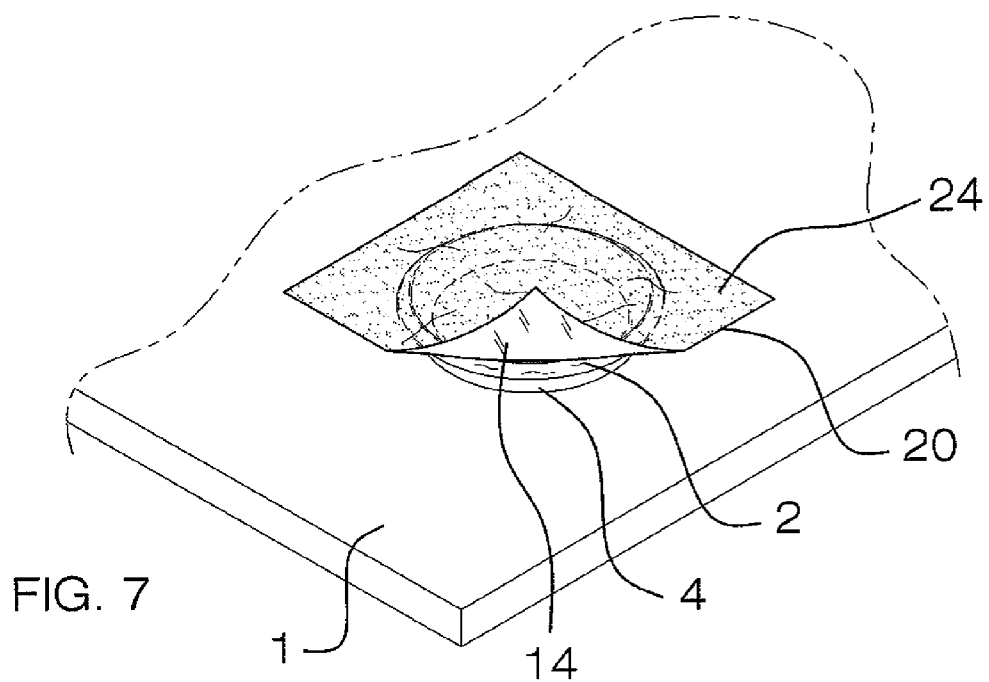
FIG. 7 is a perspective view of the present invention showing the first section and the dough positioned over a pie plate.
Figure 8:
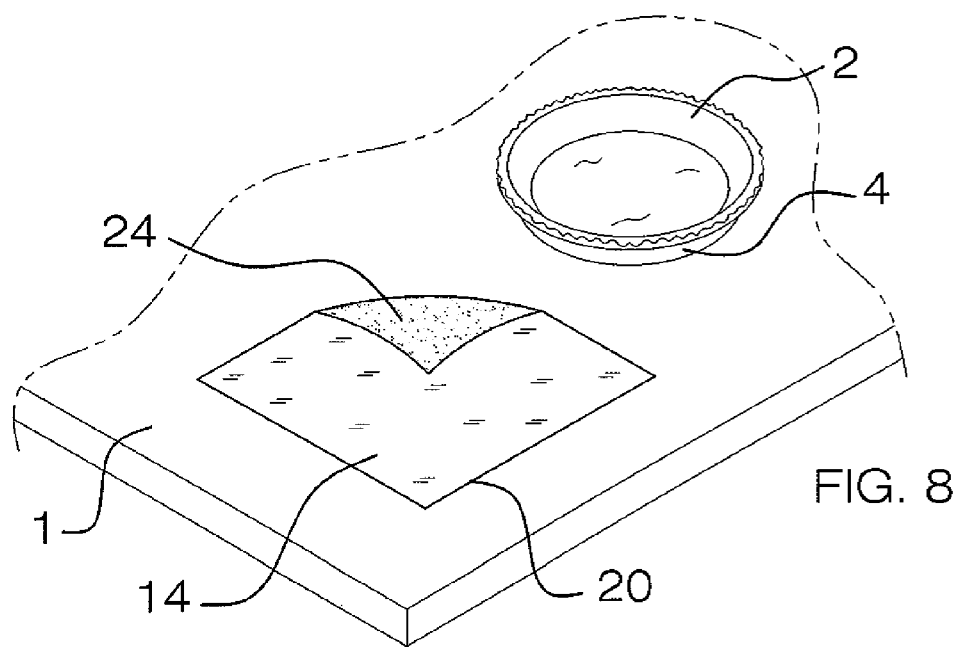
FIG. 8 is a perspective view of the present invention showing the dough on the pie plate and removed from the first section.

With reference now to the drawings, and in particular to FIGS. 1 through 8 thereof, a new dough forming device embodying the principles and concepts of the present invention and generally designated by the reference numeral 10 will be described.

As best illustrated in FIGS. 1 through 8, the mat device 10 generally comprises a sheet 12 including a top surface 14 and a bottom surface 16. The bottom surface 16 is positioned on a support surface 1.

The sheet 12 has a folding line 18 extending along a width of the sheet 12 and bisecting the sheet 12 into a first section 20 and a second section 22. The folding line 18 facilitates folding of the second section 22 with respect to the first section 20. The folding line 18 is perforated to facilitate separation of the second section 22 from the first section 20 along the folding line 18. The sheet 12 is comprised of a waxed paper to inhibit dough 2 sticking to the sheet 12 when the dough 2 is rolled out. The sheet 12 has a length of approximately 24 inches and a width of approximately 16 inches.

An adhesive 24 is coupled to the bottom surface 16 of the first section 20 of the sheet 12. The adhesive 24 releasably adheres the first section 20 to the support surface 1 when the first section 20 is placed on the support surface 1. The adhesive 24 leaves no residue on the support surface 1 when the first section 20 is removed from the support surface 1.

In use, the bottom surface 16 is place on the support surface 1. The top surface 14 of the first section 20 is pressed to adhere the first section 20 to the support surface 1. The dough 2 is placed on the top surface 14 of the first section 20. The second section 22 is folded along the folding line 18 over the dough 2 and the top surface 14 of the first section 20. A rolling pin 3 is rolled over the bottom surface 16 of the second section 22 to roll out the dough 2. The second section 22 is removed from the dough 2. The second section 22 is torn from the first section 20 along the folding line 18. The first section 20 and the dough 2 are removed from the support surface 1. The first section 20 is turned over to place the dough 2 on a pie plate 4. The first section 20 is peeled from the dough 2.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for rolling out a pie crust comprising:
   providing a mat device comprising;
      a sheet including a top surface and a bottom surface, said bottom surface being positioned on a support surface, said sheet having a folding line extending along a width of said sheet and bisecting said sheet into a first section and a second section, said folding line facilitating folding of said second section with respect to said first section, said folding line being perforated to facilitate separation of said second section from said first section along said folding line, said sheet being comprised of a waxed paper to inhibit dough sticking to said sheet when the dough is rolled out;

an adhesive being coupled to said bottom surface of said first section of said sheet, said adhesive releasably adhering said first section to the support surface when said first section is placed on said support surface, said adhesive leaving no residue on the support surface when said first section is removed from the support surface;

placing of said bottom surface on the support surface;

pressing on said top surface of said first section to adhere said first section to the support surface;

placing the dough on said top surface of said first section;

folding of said second section along said folding line over the dough and said top surface of said first section;

rolling of a rolling pin over said bottom surface of said second section to roll out the dough;

removing said second section from the dough;

removing of said first section and the dough from the support surface;

turning said first section over to place the dough on a pie plate; and peeling of said first section from the dough.

2. The method according to claim 1, further including the step of said second section being separated from said first section along said fold line when the dough has been rolled out.

3. A method for rolling out a pie crust comprising:

providing a mat device comprising;

a sheet including a top surface and a bottom surface, said bottom surface being positioned on a support surface, said sheet having a folding line extending along a width of said sheet and bisecting said sheet into a first section and a second section, said folding line facilitating folding of said second section with respect to said first section, said folding line being perforated to facilitate separation of said second section from said first section along said folding line;

an adhesive being coupled to said bottom surface of said first section of said sheet, said adhesive releasably adhering said first section to the support surface when said first section is placed on said support surface;

placing of said bottom surface on the support surface;

pressing on said top surface of said first section to adhere said first section to the support surface;

placing the dough on said top surface of said first section;

folding of said second section along said folding line over the dough and said top surface of said first section;

rolling of a rolling pin over said bottom surface of said second section to roll out the dough;

removing said second section from the dough;

removing of said first section and the dough from the support surface;

turning said first section over to place the dough on a pie plate; and peeling of said first section from the dough.

* * * * *